Aug. 20, 1935.  J. G. PAULIN  2,011,774
MEASURING INSTRUMENT HAVING AUTOMATIC ZEROIZING MECHANISM
Filed Jan. 21, 1931  2 Sheets—Sheet 1
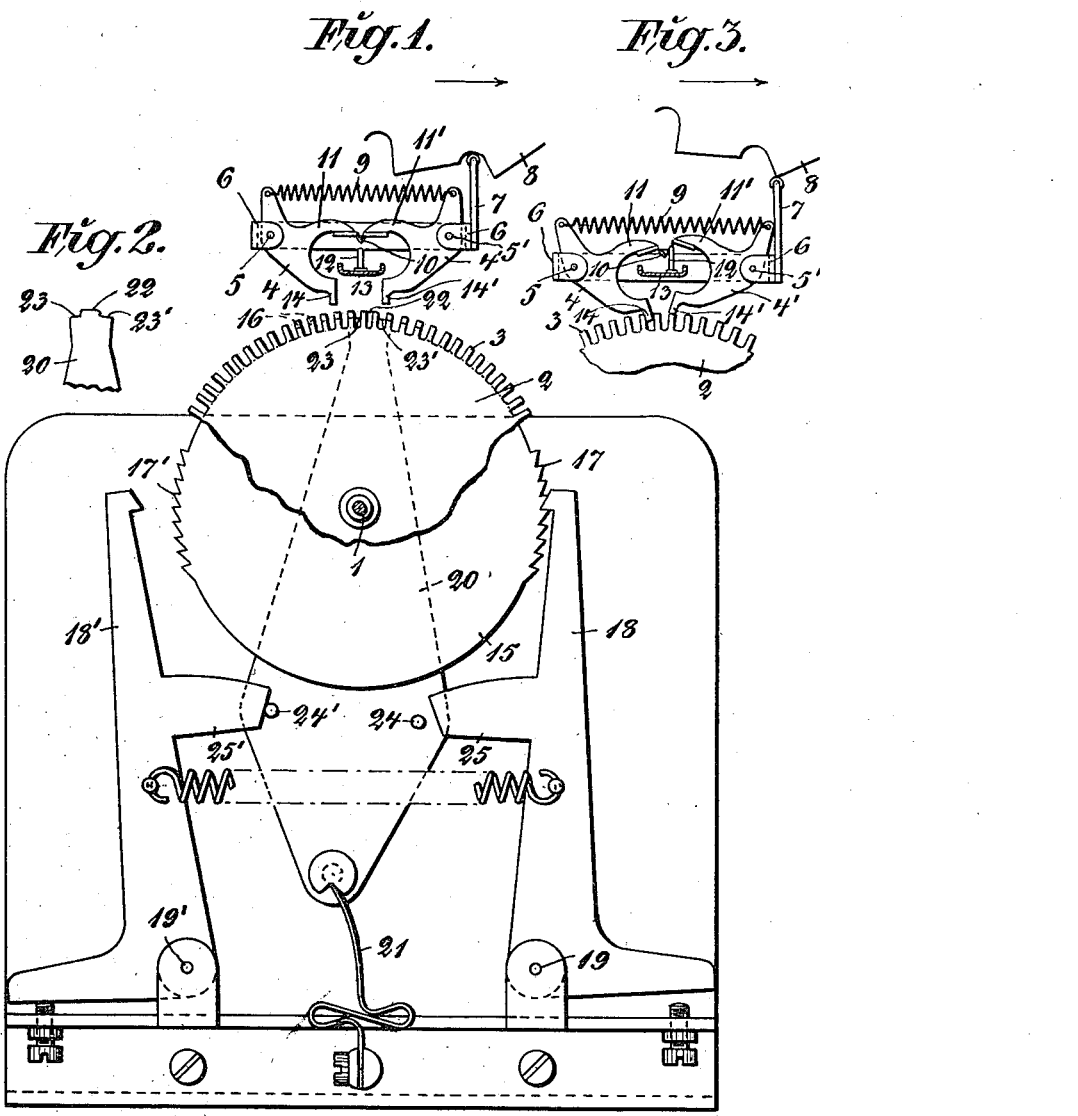

Aug. 20, 1935.  J. G. PAULIN  2,011,774
MEASURING INSTRUMENT HAVING AUTOMATIC ZEROIZING MECHANISM
Filed Jan. 21, 1931  2 Sheets-Sheet 2

J. G. Paulin
INVENTOR

By: Mark & Clark
Attys.

Patented Aug. 20, 1935

2,011,774

UNITED STATES PATENT OFFICE 2,011,774

MEASURING INSTRUMENT HAVING AUTOMATIC ZEROIZING MECHANISM

Josua Gabriel Paulin, Eskilstuna, Sweden

Application January 21, 1931, Serial No. 510,266
In Sweden January 30, 1930

8 Claims. (Cl. 73—151)

The present invention relates to instruments for measuring variable forces. More particularly it relates to such instruments, as aneroid barometers, in which a measuring member movable under the influence of said forces is automatically restored to a certain middle position by means of a zeroizing mechanism for the reading of the instrument according to the zero method. The invention has for its object to render possible an easy reading or estimation of the rapidity of fluctuation of the force measured. The possibility of ascertaining the rapidity, for instance, of the fluctuations in the atmospheric pressure measured by an aneroid is in certain cases of great value. By means of an aneroid designed in this manner and used as an altitude meter in an aircraft one may, by way of example, continually control the rate of the rising or the falling motion of the aircraft, besides which the instrument may be used as a so-called statoscope adapted to ascertain that the flying of the aircraft is performed nearly at a constant altitude. Deviations from said altitude may be observed on a particular pointer or directly on the pointer indicating the rise or fall velocity.

According to the invention the instrument is provided with a special pointer or indicator which normally, i. e. so long as the measured force remains constant, takes up a certain zero position but which, upon each zeroizing impulse of the same direction as the next preceding zeroizing impulse, is given a certain deflection in the corresponding direction and, upon each zeroizing impulse of opposite direction to the next preceding impulse, is restored to its zero position. Preferably said pointer or indicator is then provided with a locking device being under the control of the zeroizing mechanism and shiftable into two opposite locking positions. Said locking device exerts in the two locking positions mutually opposite unidirectional locking actions upon the pointer.

Figure 4:
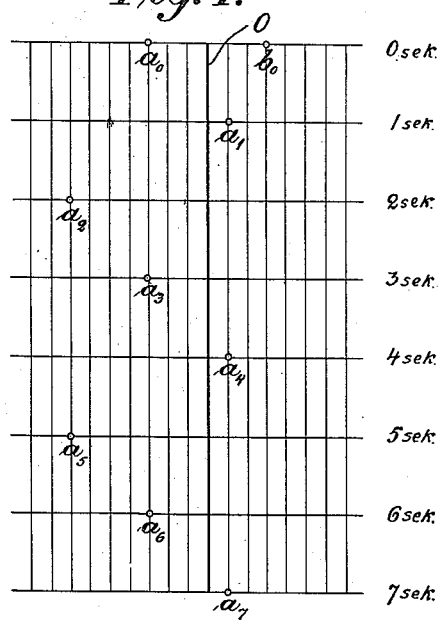
Figure 6:
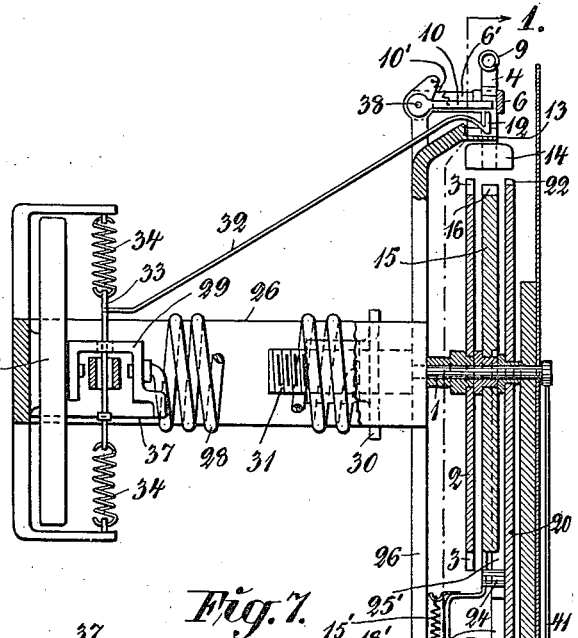
Figure 5:
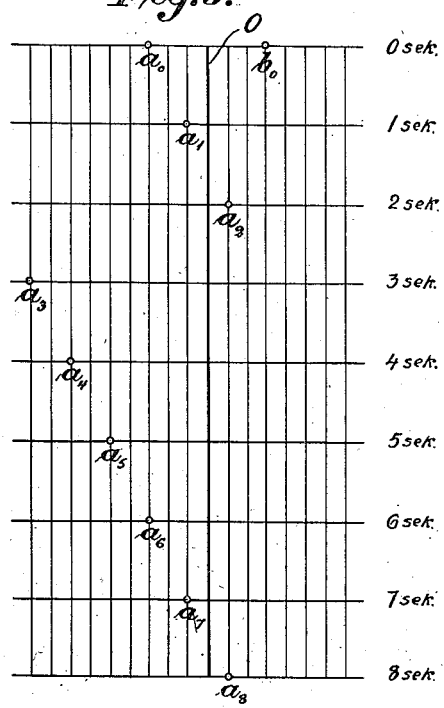
Figure 7:
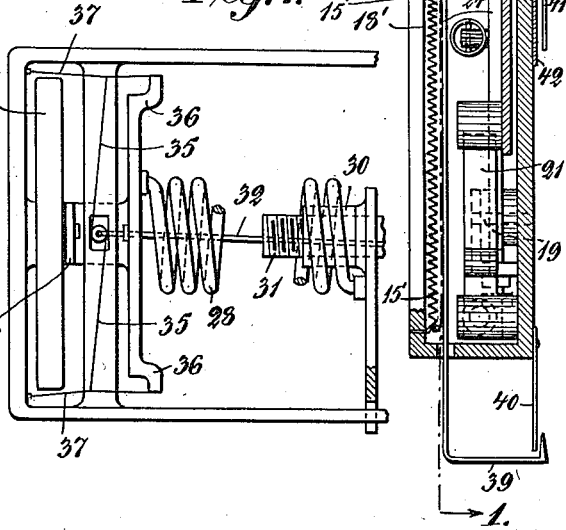

The invention will be more closely described with reference to the accompanying drawings showing an embodiment of the invention. Figure 1 is a plan view of those parts of the zeroizing device of the instrument which are concerned in the invention. Figure 2 is a detail of Figure 1. Figure 3 is a detail of the zeroizing device during the transfer of a zeroizing impulse. Figures 4 and 5 are diagrams for the explanation of the operation of the instrument. Fig. 6 is a vertical sectional view of the arrangement shown in Fig. 1 with the barometer associated therewith, and Fig. 7 is a fragmentary plan detail of the arrangement shown in Fig. 6.

The shown embodiment is assumed to relate to an aneroid barometer in which the air pressure actuating the diaphragm is balanced by an automatically adjustable counterforce which, by way of example in a manner known per se, may be constituted by the tension of a counter spring 28 which is secured at one end to the diaphragm 27 by means of a fixture 29 and at the other end to a nut 30 screwed upon a micrometer screw 31 which is secured to the shaft 1 of a toothed wheel 2. The nut 30 is provided with a laterally extending arm engaging a guide bar in the frame so that the nut without being turned, is displaced axially by the turning of the micrometer screw. The alteration of the spring tension may, however, also be brought about by means of other devices acting in the desired manner. The wheel 2 is circumferentially provided with teeth 3 and is shifted step by step alternatively in the one or the other direction by means of a stepping mechanism actuated by periodical impulses and comprising two pawls 4 and 4' which are pivoted at 5 and 5' respectively on a support 6 carried by arms 6' which in turn are pivoted at 38 (Fig. 6) on the instrument frame said pawls serving to transmit said impulses to the toothed wheel 3. Said support is provided with an arm 7 extending backwards which by its outer end carries a small wheel. The support 6 is periodically pushed towards a toothed wheel 8 against the action of a spring not shown which wheel rotates in the direction of the arrow at a constant velocity the teeth then successively engaging the end of the arm 7. The pawls 4 and 4' are normally held in the positions shown in Figure 1 by a helical spring 9 fixed under tension between rearwardly extending projections of the pawls. Between the pawls 4, 4' a member 10 forming an edge is disposed and adapted to move in the middle plane of the instrument and pivotally mounted in the frame at 38 (see Fig. 6). Under the influence of a spring 10' said edge normally takes up an upper position shown in Figure 1 immediately in front of two arms 11 and 11' extending towards the middle from the pawls. In front of the member 10 a cuspidated member 12 is movable, which member is formed at the end of a tendency pointer 32 carried by a shaft 33, which shaft is suspended between two helical springs 34 stretched in opposite directions to the frame and tending to turn the shaft about its axis in a certain direction. To a small pulley secured to the shaft 33 are fastened the ends of two wires 35 which, on the other hand, are connected with other wires 37 stretched between stationary points in the frame and arms 36 extending from a fixture 29. The arrangement is such that an increase of the atmospherical pressure will cause the wires 37 to be straightened out and the shaft 33 with the arm 32 to be turned in clock-wise direction in Figure 7; while a decrease of the pressure will cause the angle formed by wires 37 to be reduced and the point 32 to be swung to the left in Figure 7. The tendency pointer is positioned opposite the edge 10 when the diaphragm by means of the zeroizing mechanism is set in a certain middle position. In front of the cuspidated member 12 a fixed plane support 13 is disposed along which the member moves upon being deflected.

The zeroizing mechanism known per se operates in the following manner. During the rotation of the wheel 8 in the direction of the arrow from the position shown in Figure 1 the support 6 is forced by the tooth at that moment actuating the arm 7 towards the toothed wheel 2. If the pointer 32 is positioned close to its zero position it is forced by the edge of member 10 outwards in the one or the other direction. By way of example, it may be assumed that the pointer is then pushed out to the right as shown in Figure 3. The right hand pawl 4' meets thus by its arm 11' the member 12 of the pointer which latter by means of the support 13 is prevented from yielding for the pressure. The hook 14' of the pawl 4' is thus prevented from actuating the toothed wheel whereas, on the other hand, the other pawl 4 is free and brought towards the toothed wheel and by its hook 14 engages a corresponding tooth space, said pawl then turning on its pivot and moving the toothed wheel 2 one tooth pitch in a clock-wise direction. By turning the micrometer screw 31 rigidly connected to the wheel 2 through its shaft 1 and by the resulting change in the spring power acting upon the diaphragm, the diaphragm is shifted towards its middle position corresponding to the middle position of the tendency pointer. The said middle position of the diaphragm may then be passed so that the cuspidated member 12 of pointer 32, after having been released from the arm 11' upon the restoration of the support 6, may deflect in a direction opposite to that just described. If the pressure acting upon the diaphragm is constant the tendency pointer will thus during the operation of the zeroizing mechanism alternately deflect on opposite sides of the middle position at the same time as the toothed wheel 2 is alternately turned one tooth pitch in each direction. Upon a change, by way of example an increase, in the air pressure, the wheel 2 may, on the other hand, be repeatedly actuated in one and the same direction the counteracting spring power then being altered in accordance with the air pressure. When the change in air pressure has ceased the mechanism is restored to the starting position in which the counter spring thus periodically is subjected to alternate stretching and unstretching action for each turning of the toothed wheel 2 over one tooth pitch.

An indicating pointer 39 adapted to indicate the rate of change in air pressure on a scale 40 is connected with a disc 15 freely mounted on the shaft of the micrometer screw 31 which disc opposite the pawl mechanism 4, 4' is provided with a small number, in the present case ten, teeth 16. Each of the teeth 16 is positioned opposite one of the teeth 3 of the toothed wheel 2 but the teeth 16 have only about half the height of the teeth 3 and extend outwards only to about the middle of the latter teeth. To be able to engage the teeth 16 the hook 14 or 14' respectively being operated for the time being must thus penetrate more than half way down into the opposite tooth space of the wheel 2. On opposite sides of the rows of teeth 16 the disc 15 is, at diametrically opposite points, provided with a number of locking teeth 17 and 17' respectively with which two detents 18 and 18' cooperate respectively. Said detents are pivoted on the instrument frame at 19 and 19' respectively. The detents are actuated by spring power tending to press the detents towards the circumference of the disc 15. The disc 15 is normally held in its normal middle position of rest by a spring 15' (Fig. 6).

On the shaft 1 to which is secured a pointer 41 indicating the actual pressure on a scale 42 an oscillating arm 20 is freely mounted which, under the influence of a compression spring 21 engaging the end of a rear extension of said arm, may take up two end positions on opposite sides of the symmetry plane of the device and which in its middle position has an unstable equilibrium. At the end of the arm 20 facing the pawl mechanism the arm is provided with a tooth 22 of such a width that it in each of the two end positions of the arm covers two teeth and the intermediate tooth space on each of the wheels 2 and 15. On each side of the tooth 22 the arm is formed with abutments 23 and 23' respectively which two abutments are nearly on a level with the outer ends of the teeth 16 and each covers one tooth space of the wheel 15. In Figure 1 the arm 20 is shown shifted in its right hand position, a stud 24' disposed on a rear extension of the arm then holding the detent 18' out of engagement with the corresponding teeth 17' by bearing against the outer end of an arm 25' projecting from the detent. A corresponding stud 24 adapted in similar manner to cooperate with the other detent 18 is, however, brought away from the corresponding arm 25 on the detent 18 whereby said arm under the influence of the spring power engages the locking teeth 17 on the right hand side of the toothed wheel 15. In the position shown in Figure 1 on the arm 20, the right hand side abutment 23' is positioned opposite that tooth space of the toothed wheel 2 which is opposite the hook 14'. For this reason said hook, if actuated in this moment, would only penetrate half way into said tooth space and thus be prevented from engaging the lower wheel 15.

As an explanation of the operation of the device, it is assumed that the parts at a certain moment take up the positions shown in Fig. 1 the cuspidated member 12 of the tendency pointer 32 then, by way of example, being positioned somewhat to the left of the edge of member 10. When the support 6 is pushed by the toothed wheel 8 towards the wheel 2 the pawl 4 will, in above described manner, be stopped by the member 12 whereas the pawl 4' is free to be brought towards the toothed wheel 2, its hook 14' then penetrating into the corresponding tooth space until it reaches the abutment 23' of the arm 20. The pawl 4' is then turned on its pivot 5' and shifts the wheel 2 over one tooth pitch in a counter-clockwise direction and catches at the same time its arm 20 which, under the influence of its spring 21, jerks past the middle position and is shifted into the opposite end position. The stud 24 then brings the detent 18 out of engagement with the locking teeth 17 whereas instead the detent 18' by the spring power is brought into engagement with the locking teeth 17'. The disc 15 has meanwhile not been actuated because the hook 14', as mentioned above, is checked by the abutment 23' from engaging the wheel 15. If the air pressure is unaltered the tendency pointer 32 is now, on account of the change in the tension of the counter spring acting on the diaphragm, moved somewhat to the right of the middle position as soon as said pointer has been released from the arm 11. At the next forward motion of the pawl system the pawl 4' will thus be stopped by the member 12 and instead the pawl 4 with its hook 14 engages and shifts the wheel 2 and the arm 20 in a direction opposite to the preceding one whereas the wheel 15, on account of the bearing of the hook 14 against the abutment 23, is left unactuated. The parts now take up the same position as at the beginning of the procedure. As long as the air pressure remains constant the same procedure will be repeated. The wheel 2 will thus periodically be subjected to small oscillations corresponding to a tooth pitch and the tendency pointer will alternately deflect in the one or the other direction in accordance with the prevailing air-pressure. The arm 20 performs at the same time corresponding oscillations about its middle position whereas the wheel 15 stands still. The pointer adapted to indicate the rapidity of the alterations in pressure remains thus steadily in its zero position.

It may now be assumed that the air pressure, while the parts take up the position shown in Fig. 1, is subjected to a small change and then again remains constant, by way of example, depending upon the fact that the aeroplane rises a few meters and then again flies right forward without any further alteration in altitude. It may further be assumed that the tendency pointer, by the change in pressure, is brought to the right from the position shown in Fig. 1 and passes the middle position so that, upon next forward motion of the pawl system, the hook 14 is brought into engagement with the toothed wheel 2. As the arm 20 then is taking up its right hand position the hook 14 is free to penetrate down to the bottom of the corresponding tooth space said hook thus engaging also the wheel 15 and for this reason also shifting both the wheel 2 and the wheel 15 over one tooth pitch in a clockwise direction. When the detent 18' is out of engagement with the wheel 15 and the detent 18 yields upon a turning in a clockwise direction, there is no impediment to said motion of the wheel 15. By the shifting of the wheel 15, the pointer connected thereto deflects, by way of example, one scale division on an appertaining scale.

If now the changing pressure was so insignificant that the tendency pointer 32 on account of the last effected change in the tension of the counter spring is brought backwards to the left over the middle position after it has been released from the arm 11' the hook 14' will, upon the next forward motion of the pawl mechanism, be in engagement. Then the wheel 2 is brought backwards one tooth pitch, the arm 20 swung over to the left, the detent 18 brought out of engagement, and the detent 18' into engagement. Under the influence of the spring 15' acting on the disc 15 and continually tending to restore the disc to the middle position shown on the drawings, said disc is restored at the same time together with the pointer connected therewith to its middle position. The deviation of the aeroplane from the horizontal plane has thus been noticeable by a deflection of the pointer over one scale division and thereupon, after a few seconds, by its restoration to the zero position. The instrument thus operates as a sensitive statoscope.

It is now assumed that the aeroplane, after an insignificant alteration in altitude, instead of continuing in the horizontal plane starts to rise at a certain constant upward velocity of one meter per second. The shifting rapidity of the instrument, i. e. the rapidity at which the tension of the counter-spring acting upon the diaphragm is altered counted per second, upon consecutive zeroizing impulses of the same direction, is assumed to be so high that the shifting always has ample time to follow the fluctuations in the air pressure. In other words, it is assumed that the change in the tension of the counter spring acting upon the diaphragm for each zeroizing impulse is greater than the change in air pressure between two consecutive zeroizing impulses. As an example it may be assumed that the zeroizing impulses follow each other with an interval of one second, i. e. that the teeth of the toothed wheel 8 pass the arm 7 with intervals of one second, and that each zeroizing impulse brings about a change in the tension of the counter spring corresponding to a change in altitude of the aeroplane of three meters. If the altitude of the aeroplane remained unaltered and thus the pressure remained constant the tendency pointer would oscillate about a middle position with an oscillation period of two seconds and an oscillation amplitude corresponding to a difference in altitude of one and a half meter.

The constant rise at a rate of one meter per second is assumed to begin in a moment when the tendency pointer has deflected to the left and takes up the position represented by $a_0$ (Fig. 4) at a distance from the middle position represented by the line O corresponding to an altitude difference of one and a half meter. On account of the falling pressure on the diaphragm the point of the tendency pointer then starts to move to the left at a velocity corresponding to an altitude change of one meter per second. When next time, i. e. during the subsequent second, the zeroizing mechanism starts operation the pawl 4' engages and turns the wheel 2 over one tooth pitch in a counterclockwise direction, at the same time as it shifts the arm 20 from the position shown in Fig. 1 to the opposite position. On account of the continued change in air pressure the tendency pointer is not shifted by said zeroizing impulse to the opposite end position $b_0$ but to a position somewhat closer to the middle from which it continues to move to the left. The pointer has at the end of the first second reached the position $a_1$ lying somewhat to the right of the middle position at a distance therefrom corresponding to an altitude difference of half a meter. Next zeroizing impulse is now assumed to occur during the first half of the next second, thus before the tendency pointer during its continued movement to the left has had time to pass the middle position. The pawl 4 will thus engage and turn the wheel 2 over one tooth pitch in a clock-wise direction and shift the arm 20 to the position shown in Fig. 1. By the change caused thereby in the counter force acting on the diaphragm, the pointer now swings to the left a distance corresponding to an altitude difference of three meters. During the remainder of the second second the pointer moves further out to the left and has at the end of said second reached the position $a_2$ lying to the left of the middle position at a distance corresponding to an altitude difference of three and a half meters. When the zeroizing mechanism during the third second again starts operation the pawl 4' engages and turns the wheel 2 one tooth pitch in a counter clockwise direction and swings the arm 20 to the left. The pointer swings thus on account of said zeroizing impulse to the right a distance corresponding to an altitude difference of three meters but reaches then not over the middle position and continues thereupon, during the remainder of the third second, to move to the left and takes up, at the end of the third second, the position $a_3$ to the left of the middle position and at a distance corresponding to an altitude difference of one and a half meters. The pointer thus takes up now the same position as at the beginning of the first second but the oscillating lever 20 is shifted into the opposite position and the detent 18 is pushed out by the stud 24 of the arm 20 whereas, on the other hand, the detent 18' is in engaging position. When thus the zeroizing mechanism now during the fourth second starts operation anew, the pawl 4' engages both the wheel 2 and the wheel 15 and both wheels are then shifted in common over one tooth pitch in a counter clockwise direction whereby the pointer connected with the wheel 15 deflects one scale division. In this position the wheel 15 together with the appertaining pointer is retained by the engagement of the detent 18' and is thus prevented from returning under the influence of the spring acting thereon and which, as mentioned above, tends to restore the wheel 15 and the pointer to the middle position. At the end of the fourth second the tendency pointer is positioned to the right of the middle line in the position $a_4$, i. e. in the same position as at the end of the first second.

During the fifth second the pawl 4 engages the wheel 2 but is prevented by the abutment 23 of the arm 20 to engage the wheel 15. Thus the wheel 2 is shifted over one tooth pitch in a clockwise direction and the oscillating lever 20 jerks over to the right. The detent 18' is thus pushed away by the pin 24' whereby the wheel 15 together with the pointer connected therewith is released and restored to zero position under the influence of the spring power acting thereon. At the end of the fifth second the tendency pointer takes up the position $a_5$, i. e. the same position as at the end of the second second. During the sixth second the same procedure takes place as during the third second etc. So long as the aircraft is continually rising at a rate of one meter per second the rise pointer, i. e. the pointer connected with the wheel 15, makes a deflection of one scale division for each third second and is each time after one second returned to the zero position.

It may now be assumed instead that the aircraft, under exactly the same initial conditions as in the above described case, starts to rise at a constant rate of two meters per second. At the beginning of the rising movement the tendency pointer takes up the position $a_0$, Fig. 5, and the oscillating lever 20 takes up its right hand position as shown in Fig. 1. The tendency pointer tends in this case to move to the left with a rapidity twice as high as the rapidity in the preceding case. During the first second the wheel 2 obtains a zeroizing impulse from the pawl 4' and the tendency pointer performs thus during this second a swinging to the right corresponding to an altitude difference of three meters and a movement to the left corresponding to an altitude difference of two meters and lies thus at the end of the first second in a position $a_1$ to the left of the middle position and at a distance therefrom corresponding to an altitude difference of half a meter. During the first second the oscillating lever 20 has further been brought over to the left. During the second second the pawl 4' is again operated and engages now both the wheel 3 and the wheel 15 the rise pointer thus making a deflection of one scale division. At the end of the second second the tendency pointer takes up the position $a_2$ next to the right of the middle position and during the third second the pawl 4 will transfer a zeroizing impulse as said pawl engages the wheel 3 but is prevented by the abutment 23 to engage the wheel 15. The arm 20 jerks over and pushes out the detent 18' so that the wheel 15 together with the rise pointer is restored to zero position. During the third second the zeroizing impulse from the pawl 4 and the continued rise actuate the tendency pointer in the same direction which pointer at the end of the third second takes up a position $a_3$ to the left of the middle position and at a distance therefrom corresponds to an altitude difference of four and a half meters. During the fourth second the pawl 4' operates and transfers a zeroizing impulse which, in relation to the tendency pointer, operates in a direction opposite to the continued rise. The tendency pointer is thus, at the end of the fourth second, still to the left of the middle position at a distance corresponding to an altitude difference of three and a half meters. During the fourth second the arm 20 has been shifted from its right hand to its left hand position. During the fifth second the pawl 4' transfers again an impulse and engages now both the wheel 2 and the wheel 15 whereby thus the rise pointer deflects one scale division in which position it is retained by the engagement of the detent 18' into the wheel 15. At the end of the fifth second the tendency pointer deflects still to the left and the pawl 4' actuates thus during the sixth second anew both the wheels 2 and 15 the rise pointer thus deflecting another scale division in which position it is still retained by the detent 18'. At the end of both the sixth and the seventh second the tendency pointer lies still to the left of the middle position in the positions $a_6$ and $a_7$ respectively for which reason the pawl 4' also during the course of each of the seventh and eighth seconds operates impulse transferring and engages both wheels 2 and 15 whereby thus the rise pointer at the end of the eighth second has deflected four scale divisions. At the end of the eighth second the tendency pointer takes up the same position as at the end of the second second thus next to the right of the middle position. During the ninth second the pawl 4 will thus be operating and engages the wheel 2 but not the wheel 15 and jerks over the lever 20 which in turn pushes away the detent 18' so that the wheel 15 together with the rise pointer is restored to zero position. The same procedure is thereupon repeated periodically as the tendency pointer during each period of six seconds deflects four scale divisions and thereupon returns to zero.

By a suitable tooth gearing or the like the shifting rapidity of the instrument may be altered so that the shifting of the wheel 2 for each tooth pitch corresponds to an altitude difference of, by way of example, six meters per second instead of three meters per second. Evidently the deflection of the rise pointer then represents other rise velocities. The scale may then be provided with double graduations or several graduations in case there are several shifting velocities.

Between the wheel 2 in the shifting mechanism and the device for altering the spring power in the aneroid such an adjustable gearing may, of course, be disposed according to known principles that the turning of the wheel for each tooth pitch corresponds to a certain altitude change instead of a certain change in pressure.

I claim:—

1. An instrument for indicating the rate of change of variable forces comprising in combination a measuring member movable under the influence of the variable forces, a counter-spring acting upon the measuring member, a resetting mechanism including means to vary the tension of the counter-spring, driving means, means under control of the measuring member for imparting intermittently resetting impulses, from said driving means to the resetting mechanism, the direction of resetting being under the control of the measuring member, an indicating member movable independently of the measuring member and adapted to be set stepwise from a middle position in connection with said resetting mechanism, and means for restoring said indicating member to a middle position upon a change in the resetting direction.

2. An instrument for indicating the rate of change of variable forces comprising in combination a measuring member movable under the influence of the variable forces, a counter-spring acting upon the measuring member, a resetting mechanism including means to vary the tension of the counter-spring, driving means, means under the control of the measuring member for imparting intermittently resetting impulses, from said driving means to the resetting mechanism, the direction of resetting being under the control of the measuring member, an indicating member movable independently of the measuring member and adapted to be set stepwise from a middle position in connection with said resetting mechanism, a control member adapted to be shifted from one control position to another upon a change in the resetting direction, and means for restoring the indicating member to a middle position upon a shifting of the control member.

3. An instrument for indicating the rate of change of variable forces comprising in combination a measuring member movable under the influence of the variable forces, a counter-spring acting upon the measuring member, a resetting mechanism including means to vary the tension of the counter-spring, an indicating member movable independently of the measuring member and adapted to be set stepwise from a middle position of rest, a driving device, means for transmitting intermittent resetting impulses from said driving device to the resetting mechanism and for transmitting setting impulses from the driving device to the indicating member, the direction of resetting being under the control of the measuring member, and means for restoring said indicating member to a middle position upon a change in the resetting direction.

4. An instrument for indicating the rate of change of variable forces comprising in combination a measuring member movable under the influence of the variable forces, a counter-spring acting upon the measuring member, a resetting mechanism including means to vary the tension of the counter-spring, an indicating member movable independently of the measuring member and adapted to be set stepwise from a middle position of rest, a driving device, means for transmitting intermittent resetting impulses from said driving device to the resetting mechanism and for transmitting setting impulses from the driving device to the indicating member, the direction of resetting being under the control of the measuring member, a control member under the control of the impulse transmitting means adapted to be shifted from one control position to another upon a change in the resetting direction, means under the control of said control member for limiting the direction of movement of the indicating member, and other means for restoring the indicating member to a middle position upon a shifting of the control member.

5. An instrument for indicating the rate of change of variable forces comprising in combination a measuring member movable under the influence of the variable forces, a counter-spring acting upon the measuring member, a resetting mechanism comprising a step-wise rotatable resetting wheel, a rotatable indicating member freely mounted coaxially with said resetting wheel, a driving device, means for transmitting intermittent rotary impulses to the resetting wheel and the indicating member, the direction of rotation of the resetting wheel being under the control of the measuring member, and resilient means tending to restore the indicating member to middle position, locking means for retaining the indicating member in the position set by said rotary impulses and means for unlocking said locking means upon a change of the direction of rotation of the resetting wheel.

6. An instrument for indicating the rate of change of variable forces comprising in combination a measuring member movable under the influence of the variable forces, a counter-spring acting upon the measuring member, a resetting mechanism comprising a step-wise rotatable resetting wheel, a rotatable indicating member freely mounted coaxially with said resetting wheel, a driving device, means for transmitting intermittent rotary impulses to the resetting wheel and the indicating member, the direction of rotation of the resetting wheel being under the control of the measuring member, a rotatable control member mounted coaxially with the resetting wheel and adapted to be shifted from one control position to another upon a change of the direction of rotation of the resetting wheel, resilient means tending to restore the indicating member to middle position, locking means for retaining the indicating member in the position set by said rotary impulses, and means under control of said control member for unlocking said locking means.

7. An instrument as claimed in claim 6, characterized in that the locking means comprises two detents adapted to engage the indicating member alternately under the control of the control member.

8. An instrument as claimed in claim 6, in which said impulse transmitting means comprises two impulse transmitting pawls adapted to cooperate, under the control of the measuring member, alternately with a toothing at the circumference of the resetting wheel, the indicating member being also provided with a toothing coaxial with said first toothing but having a smaller diameter, the movement of the one or the other pawls, according to the position of the control member, being limited in radial direction by an abutment on the control member so as to prevent the engagement of the second toothing by the pawl.

JOSUA GABRIEL PAULIN.